US012596926B2

(12) United States Patent
Charania et al.

(10) Patent No.: US 12,596,926 B2
(45) Date of Patent: Apr. 7, 2026

(54) SYSTEMS AND METHODS FOR ADJUSTING DATA PROCESSING COMPONENTS FOR NON-OPERATIONAL TARGETS

(71) Applicant: Capital One Services, LLC, McLean, VA (US)

(72) Inventors: Aamer Charania, Flower Mound, TX (US); Abhisek Jana, Herndon, VA (US); Jiankun Liu, Flower Mound, TX (US); Behrouz Saghafi Khadem, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 775 days.

(21) Appl. No.: 17/956,996

(22) Filed: Sep. 30, 2022

(65) Prior Publication Data

US 2024/0112017 A1    Apr. 4, 2024

(51) Int. Cl.
| | |
|---|---|
| *G06N 3/08* | (2023.01) |
| *G06F 18/22* | (2023.01) |
| *G06F 18/2413* | (2023.01) |
| *G06N 3/04* | (2023.01) |
| *G06N 3/063* | (2023.01) |
| *G06N 20/20* | (2019.01) |

(52) U.S. Cl.
CPC .............. *G06N 3/08* (2013.01); *G06F 18/22* (2023.01); *G06F 18/24147* (2023.01); *G06N 3/04* (2013.01); *G06N 3/063* (2013.01); *G06N 20/20* (2019.01)

(58) Field of Classification Search
CPC ........... G06N 3/08; G06N 3/04; G06N 3/063; G06N 20/20; G06N 20/00; G06N 3/042; G06N 5/01; G06F 18/22; G06F 18/24147; G06F 18/29
USPC .......................................................... 706/25
See application file for complete search history.

(56) References Cited

U.S. PATENT DOCUMENTS

| | | | |
|---|---|---|---|
| 2019/0251480 A1* | 8/2019 | Garcia Duran ........ | G06N 20/20 |
| 2022/0253671 A1* | 8/2022 | Chamberlain .......... | G06F 17/16 |
| 2023/0062114 A1* | 3/2023 | Rout ...................... | G06N 20/00 |

* cited by examiner

*Primary Examiner* — Hope C Sheffield
(74) *Attorney, Agent, or Firm* — Foley & Lardner LLP

(57) ABSTRACT

Systems and methods for adjusting data processing components. In some aspects, the systems and methods include training a first machine learning model using a similarity graph generated based on training entries to predict whether a target system related to a node in the similarity graph will be non-operational within a future period of time, processing using the trained first machine learning model an updated similarity graph generated based on training and inference entries to predict for each node for the inference entries whether a target system related to the node will be non-operational within the future period of time, processing using a second machine learning model predictions and associated inference entries to predict that a target system related to a node for an entry will be non-operational within the future period of time, and adjusting data processing components related to the target system.

20 Claims, 4 Drawing Sheets

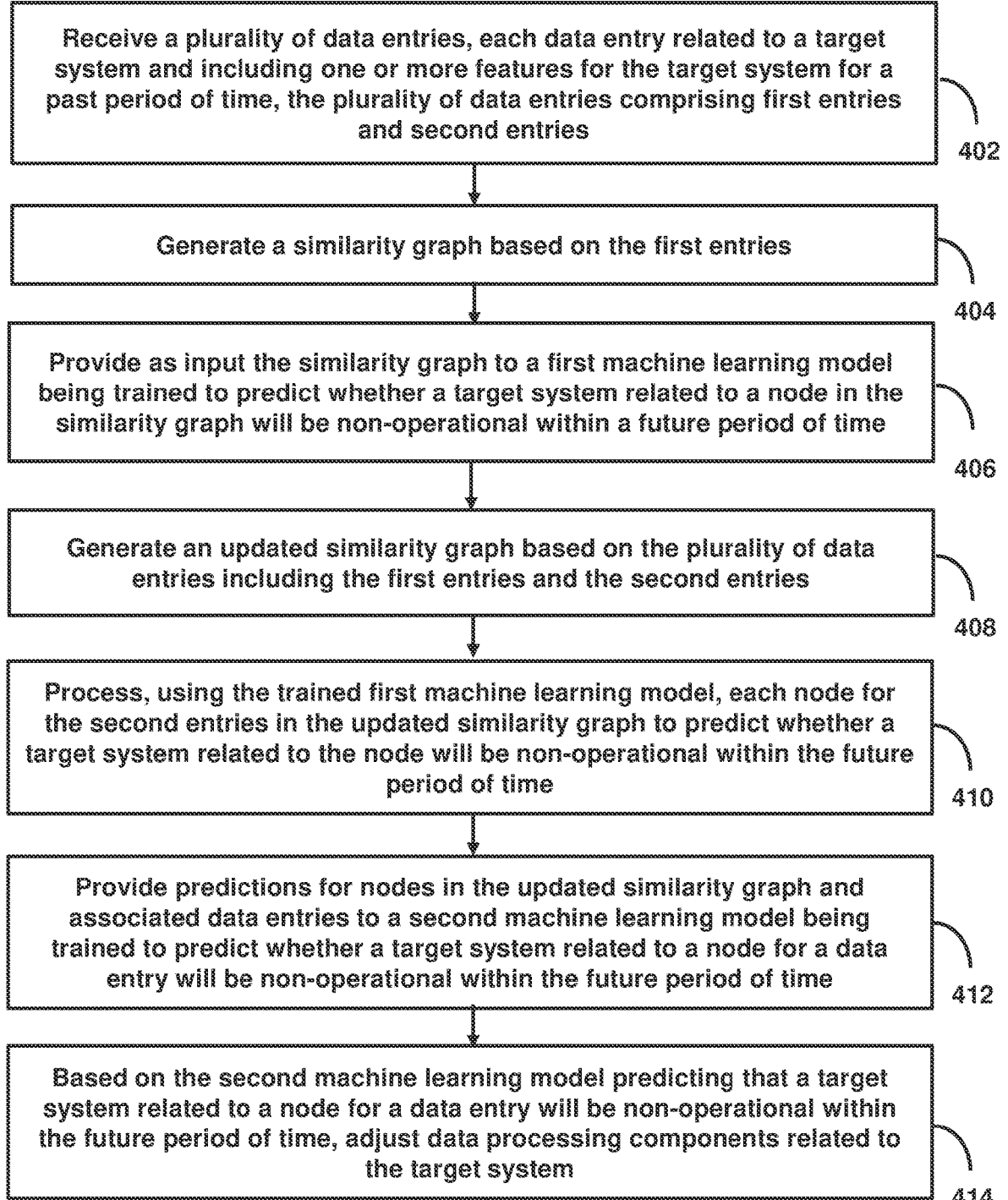

400

Receive a plurality of data entries, each data entry related to a target system and including one or more features for the target system for a past period of time, the plurality of data entries comprising first entries and second entries

402

Generate a similarity graph based on the first entries

404

Provide as input the similarity graph to a first machine learning model being trained to predict whether a target system related to a node in the similarity graph will be non-operational within a future period of time

406

Generate an updated similarity graph based on the plurality of data entries including the first entries and the second entries

408

Process, using the trained first machine learning model, each node for the second entries in the updated similarity graph to predict whether a target system related to the node will be non-operational within the future period of time

410

Provide predictions for nodes in the updated similarity graph and associated data entries to a second machine learning model being trained to predict whether a target system related to a node for a data entry will be non-operational within the future period of time

412

Based on the second machine learning model predicting that a target system related to a node for a data entry will be non-operational within the future period of time, adjust data processing components related to the target system

SYSTEMS AND METHODS FOR ADJUSTING DATA PROCESSING COMPONENTS FOR NON-OPERATIONAL TARGETS

BACKGROUND

In recent years the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results. These technical problems present an inherent problem with attempting to use an artificial intelligence-based solution for predicting from tabular data when a target system will become non-operational.

SUMMARY

Methods and systems are described herein for novel uses and/or improvements to artificial intelligence applications for predicting when a target (e.g., a target system) will become non operational. As one example, methods and systems are described herein for a similarity graph-based approach for predicting from tabular data when a target system will become non-operational. Such tabular data is typically imbalanced and includes few instances of the activity to be predicted. For example, the tabular data may include information regarding activity of target systems but may include very few instances of a target system becoming non-operational.

The detection of when a target system will become non-operational presents a unique challenge because such an event typically leads to loss of resources and data that were previously allocated to the target system. However, if the target system may be identified as a candidate for becoming non-operational within a future period of time, proactive measures may be taken to ensure that such an event does not take place (e.g., by allocating further resources or data processing components), or further resources and data may be allocated elsewhere instead of the target system (e.g., by allocating further resources or data processing components to another system).

The use of artificial intelligence may seem like a natural choice to apply to the detection of when a target system will become non-operational. However, the use of artificial intelligence for this application has a fundamental flaw that presents a unique technical challenge for the detection of when a target system will become non-operational; namely, artificial intelligence, whether based on machine learning, deep learning, etc., requires ample and high-quality training data to train a model to make accurate and precise determinations. Such training data is not readily available. This is because tabular data available in such circumstances is typically imbalanced and includes few instances of the activity to be predicted, rendering it unsuitable for conventional approaches.

Conventional approaches to overcoming the technical problem of sparse high-quality training data are not appropriate for the detection of when a target system will become non operational. For example, a conventional approach to overcoming the technical problem of sparse high-quality training data would entail manual creation of training data that may be indicative of a target system becoming non-operational within a future period of time. However, not only is such a solution time-consuming (e.g., each example must be individually identified, created, and programmed), but manually created training data is unlikely to be effective in real-world situations.

To overcome this technical problem, the methods and systems propose a novel architecture for an artificial intelligence model that leverages a similarity graph-based approach. Such an approach may leverage information from other similar data points, whether from other time stamps or pertaining to other instances, in order to help improve prediction rate. Specifically, the methods and systems disclosed herein generate a similarity graph from the tabular data and apply a graph neural network followed by a gradient boosting machine to predict whether a target system will become non-operational within a future period of time (e.g., three months, or another suitable period of time). For example, leveraging the graph neural network on the similarity graph followed by the gradient boosting machine provides an improved prediction rate as compared with conventional approaches.

Conventional systems have not contemplated improving prediction rate by applying a similarity graph to tabular data, especially in situations where there were few instances in the training data for the activity to be predicted. By relying on this unconventional architecture, the system overcomes the technical problem associated with the conventional solutions to training artificial intelligence models with sparse high-quality training data. Accordingly, the methods and systems provide a similarity graph-based approach for predicting from tabular data when a target system will become non-operational, which improves accuracy over conventional approaches while leveraging tabular data despite its limitations, such as lack of suitable training data.

In some aspects, a system for adjusting data processing components related to a target system predicted to be non-operational within a future period of time includes one or more processors and a non-transitory, computer-readable medium comprising instructions that, when executed by the one or more processors, cause operations. The operations include receiving a plurality of data entries in tabular form. Each data entry is related to a target system and includes one or more features for the target system for a past period of time. The plurality of data entries includes training entries and inference entries. The operations further include determining a similarity metric for each pair of the plurality of data entries. The operations further include generating a similarity graph based on the training entries. The similarity graph connects a node for a training entry to another node for another training entry with a similarity metric that satisfies a threshold. In some embodiments, the node for the training entry may be connected to a fixed number of nodes for other training entries that are most similar to the node for the training entry. The operations further include providing as input the similarity graph to a graph neural network being trained to predict whether a target system related to a node in the similarity graph will be non-operational within a future period of time. The operations further include generating an updated similarity graph based on the plurality of data entries including the training entries and the inference entries. The updated similarity graph connects a node for a data entry to another node for another data entry with a similarity metric that satisfies the threshold. In some embodiments, the node for the data entry may be connected to a fixed number of nodes for other data entries that are most similar to the node for the data entry. The operations further include processing, using the trained graph neural network, each node for the inference entries in the updated similarity graph to predict whether a target system related to the node will be non operational within the future period of time. The operations further include providing predictions for nodes in the updated similarity graph and associated data entries to a gradient boosting machine or a logistic regression classifier to predict whether a target system related to a node for a data entry will be non-operational within the future period of time. The operations further include, in response to the gradient boosting machine or the logistic regression classifier predicting that a target system related to a node for a data entry will be non-operational within the future period of time, adjusting data processing components related to the target system.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in adjusting data processing components related to prediction of a target system to be non-operational within a future period of time, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
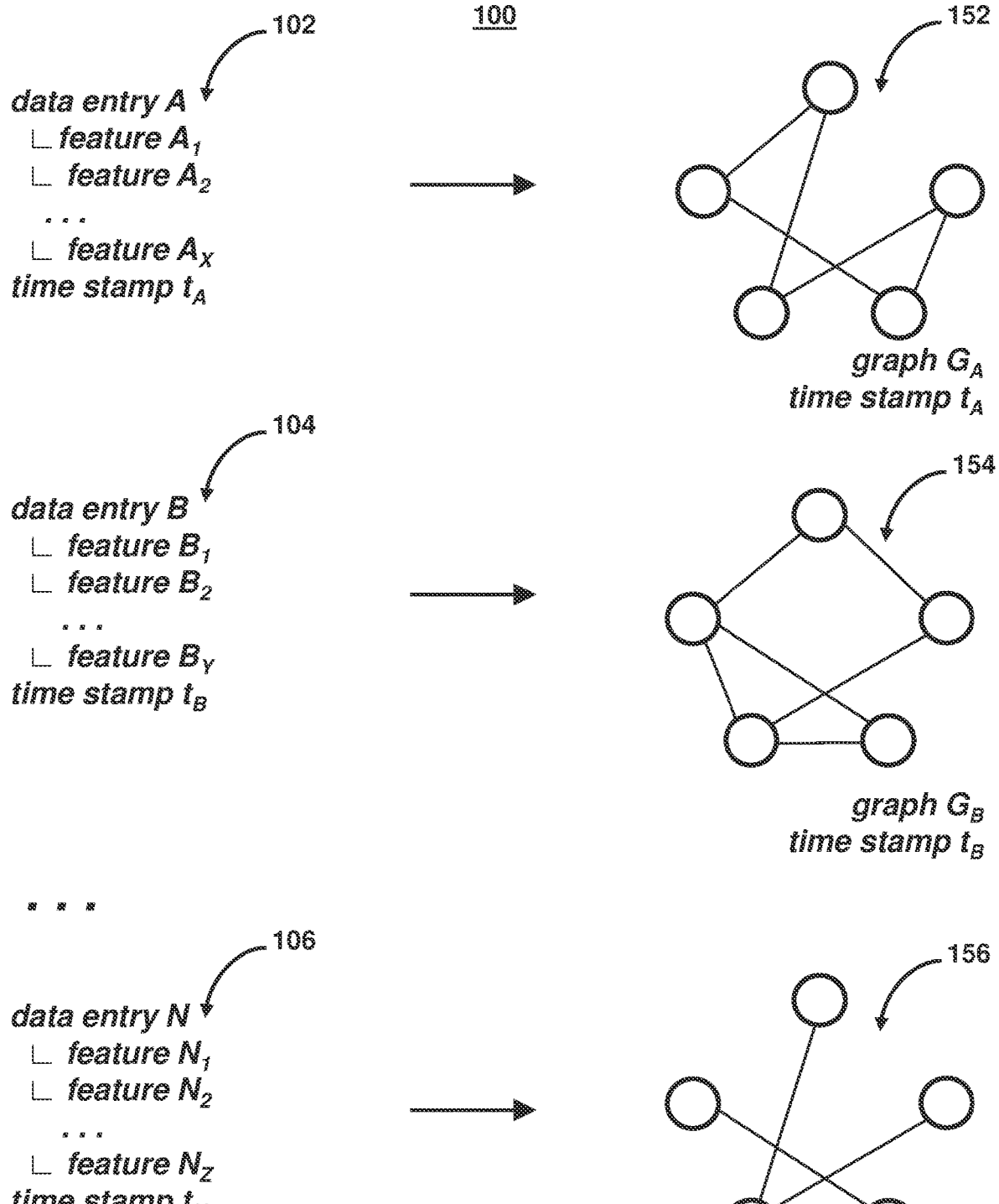
FIG. 1 shows an illustrative diagram for tabular data and corresponding time stamped graphs used to predict whether a target system will become non-operational within a future period of time, in accordance with one or more embodiments.

FIG. 1 shows an illustrative diagram 100 for tabular data and corresponding time-stamped graphs used to predict whether a target system will become non-operational within a future period, in accordance with one or more embodiments. For example, FIG. 1 illustrates a time-stamped graph that represents features associated with a time stamp. Conventional systems for analyzing tabular data to predict such features looked at each row or data entry independently, while the system may use the graph-based approach that leverages relationships across rows to predict relevant features.

In some embodiments, the time-stamped tabular data that is received may include data entries A, B, . . . , N and associated time stamps $t_A$, $t_B$, . . . , $t_N$. This time stamped tabular data may be considered to represent a time series indexed in order by the associated time stamps. For example. FIG. 1 shows data entries 102, 104, and 106 (corresponding to data entries A, B, and N). In some embodiments, the data entries and associated time stamps may be received separately (e.g., from different sources, or in different files, etc.). In some embodiments, the data entries and associated time stamps may be received together (e.g., from the same source, or in the same file, etc.).

Data entry A includes information regarding feature values $A_1$, $A_2$, . . . , $A_X$ associated with time stamp $t_A$. For example, feature values $A_1$, $A_2$, . . . , $A_X$ may represent X feature values (or other suitable data) for a particular month, day, or hour (or another suitable period of time) represented by time stamp $t_A$. Similarly, data entry B includes information regarding feature values $B_1$, $B_2$, . . . , By associated with time stamp $t_B$. For example, feature values $B_1$, $B_2$, . . . , $B_Y$ may represent Y feature values (or other suitable data) for a particular month, day, or hour (or another suitable period of time) represented by time stamp $t_B$.

Similarly, data entry N includes information regarding feature values $N_1$, $N_2$, . . . , $N_Z$ associated with time stamp $t_N$. For example, feature values $N_1$, $N_2$, . . . , $N_Z$ may represent Z feature values (or other suitable data) for a particular month, day, or hour (or another suitable period of time) represented by time stamp $t_N$. The number of feature values represented by each data entry may be the same or may vary and any such variations should be considered within the scope and spirit of this disclosure.

In some embodiments, each data entry (or row or another suitable portion) of the time stamped tabular data is converted into a corresponding graph representation. For example, for a given data entry, one or more features and their relationships may be identified. The corresponding graph representation or graph for the data entry, also referred to herein as a "time stamped graph," may include the features as nodes and the relationships may be indicated via edges connecting the appropriate nodes. For example, FIG. 1 shows data entries 102, 104, and 106 (corresponding to data entries A, B, and N) and associated time-stamped graphs 152, 154, and 156 (corresponding to graphs $G_A$, $G_B$, and $G_N$). In some embodiments, the data entries and associated time-stamped graphs may be received separately (e.g., from different sources, or in different files, etc.). In some embodiments, the data entries and associated time-stamped graphs may be received together (e.g., from the same source, or in the same file, etc.). In some embodiments, the data entries may be received, and the associated time-stamped graphs may be subsequently generated. In some embodiments, the data entries may be received at a remote location, the associated time-stamped graphs may be generated at the remote location, and only the time-stamped graphs may be received from the remote location.

Graph $G_A$ includes nodes and edges representing feature values from data entry A. For example, the feature values $A_1, A_2, \ldots, A_X$ may represent X feature values (or other suitable data) for a particular month, day, or hour (or another suitable period of time) represented by time stamp $t_A$, and in graph $G_A$, each node may represent a feature, and each edge may represent a relationship between the nodes connected by the edge for a particular month, day, or hour (or another suitable period of time) represented by time stamp $t_A$. Similarly, graph $G_B$ includes nodes and edges representing feature values from data entry B. For example, the feature values $B_1, B_2, \ldots, B_Y$ may represent Y feature values (or other suitable data) for a particular month, day, or hour (or another suitable period of time) represented by time stamp $t_A$, and in graph $G_B$, each node may represent a feature, and each edge may represent a relationship between the nodes connected by the edge for a particular month, day, or hour (or another suitable period of time) represented by time stamp $t_B$.

Similarly, graph $G_N$ includes nodes and edges representing feature values from data entry N. For example, the feature values $N_1, N_2, \ldots, N_Z$ may represent Z feature values (or other suitable data) for a particular month, day, or hour (or another suitable period of time) represented by time stamp $t_N$, and in graph $G_N$, each node may represent a feature, and each edge may represent a relationship between the nodes connected by the edge for a particular month, day, or hour (or another suitable period of time) represented by time stamp $t_N$.

In some embodiments, each time-stamped graph may be converted into a set of graph embeddings suitable for applying one or more machine learning techniques. As referred to herein, graph embeddings may include information regarding graph topology, node-to-node relationship, and other relevant information about graphs, subgraphs, and nodes. In one example, each node may be encoded with its own vector representation using techniques such as Deep-Walk, node2vec, structural deep network embedding (SDNE), etc. This embedding may be used to perform visualization or prediction on the node level, e.g., visualization of nodes in the 2D plane, or prediction of new connections based on node similarities. In another example, the whole graph may be represented with a single vector using techniques such as graph2vec, etc. Those embeddings may be used to make predictions on the graph level and to compare or visualize the whole graphs. While graphs are a meaningful and understandable representation of data, graph embeddings may be more suitable for applying machine learning techniques. Machine learning on graphs is limited. Because graphs consist of edges and nodes, those network relationships can only use a specific subset of mathematics, statistics, and machine learning. On the other hand, vector spaces have a richer toolset of approaches. Further, graph embeddings are compressed representations and can pack node properties in a vector with a smaller dimension. As a result, vector operations are simpler and faster than comparable operations on graphs.

As referred to herein, a "data entry" may include a row, a column, or another suitable portion of tabular data. For example, the data entry may include information related to a target system, such as one or more features for the target system for a past period of time.

As referred to herein, a "feature" may be represented in a data entry and may include information regarding a target system.

As referred to herein, "data processing components" may include resources, such as computing resources, financial resources, etc. that may be allocated to a target system. For example, if the target system may be identified as a candidate for becoming non-operational within a future period of time, proactive measures may be taken to ensure that such an event does not take place by adjusting data processing components allocated to the target system.

In some embodiments, each month on average around 10-15 auto dealers may become non operational or go out of business. There may be a time lag between funding and title perfection which may expose the lending institution and customers to financial risk. The described systems and methods may be used to identify auto dealers who are likely to go out of business ahead of time (e.g., within the next three months) and inform the lending institution so the lending institution may allow for any proactive measures to be taken, if needed. This may prevent financial loss for the lending institution as well as customers.

In some embodiments, tabular data (e.g., with columns as features and rows as samples) may be received and a similarity graph may be generated by representing each auto dealer per month as an individual node enriched with business features. The similarity between nodes may be computed using a similarity metric such as Euclidean distance or cosine similarity on the business features. The similarity graph may be constructed by connecting each node to its k neighboring nodes with highest similarity or neighbors with similarity more than a threshold. The similarity graph may be constructed on training nodes pertaining to training dealer-months. Then a Graph Neural Network (GNN) may be trained on the graph to minimize the negative log likelihood loss on the training data. After training the GNN, the inference nodes pertaining to inference dealer-months may be added to the graph and the similarity graph may be recomputed. The inferencing may be accomplished by feed forwarding the inference nodes through the trained GNN model to get either the classification labels from the output of the network or the embeddings from the last hidden layer and concatenating them with original features and classifying them using a classifier such as a Gradient Boosting Machine (GBM) or a Logistic Regression Classifier (LRC). This approach may capture and utilize the similarity between dealers across different months and specifically work very well in out-of-time prediction where the model is trained with the same dealers and being used for prediction of going out of business in future months.

The described systems and methods address the technical problem of how to predict from tabular data when a target system (e.g., an auto dealer) will become non-operational (e.g., go out of business). Such tabular data is typically imbalanced and includes few instances of the activity to be predicted. For example, the tabular data may include information regarding activity of an auto dealer but may include very few instances of an auto dealer going out of business.

The solution to this technical problem, in some embodiments, includes generating a similarity graph from the tabular data and applying a graph neural network followed by a gradient boosting machine or a logistic regression classifier to predict whether the target system will become non-operational within a future period of time (e.g., three months or another suitable period of time). Solving this technical problem provides the practical benefit of improving prediction rate as conventional systems did not contemplate applying a similarity graph to tabular data especially in situations where there are few instances in the training data for the activity to be predicted.

Figure 2:
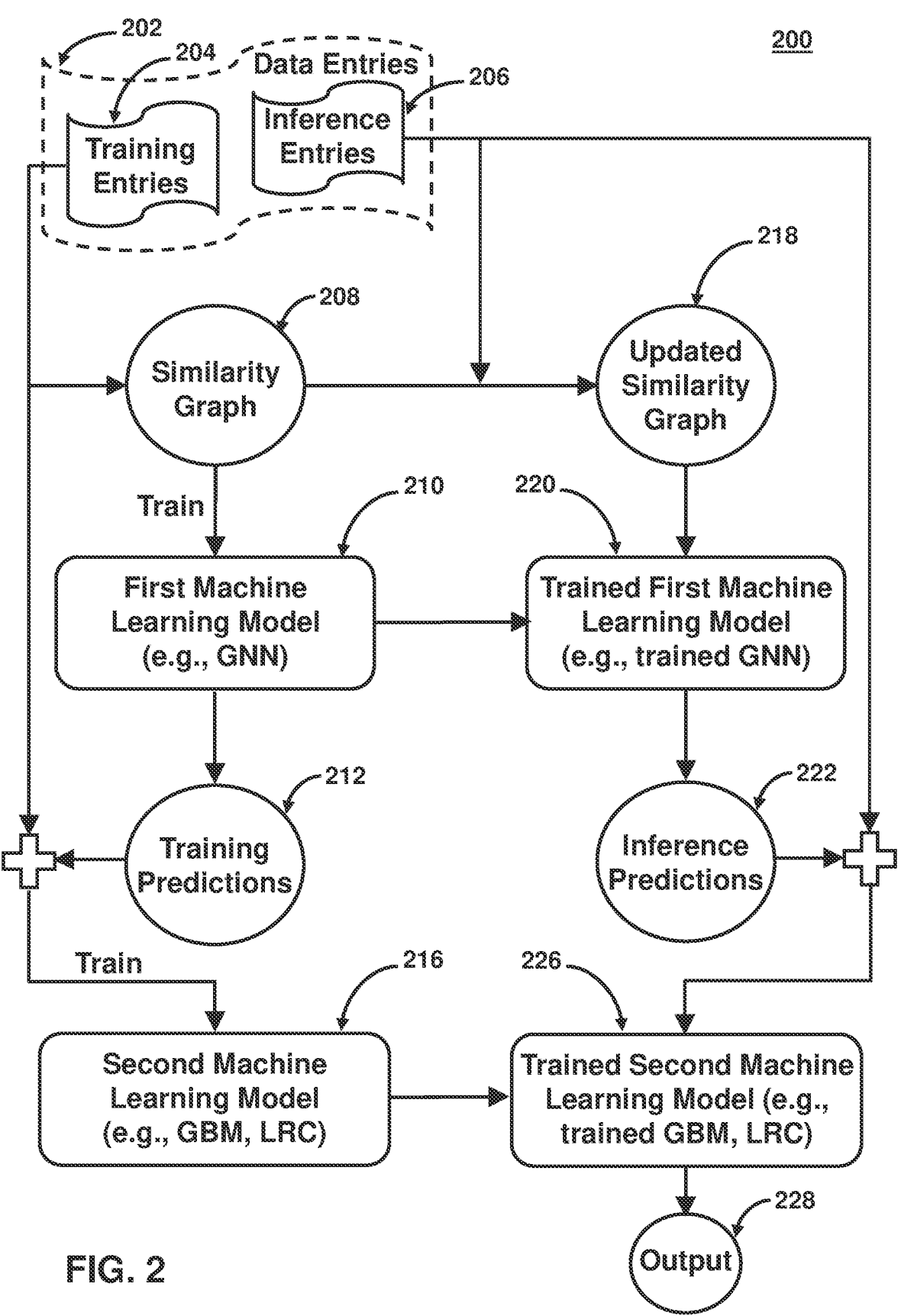
FIG. 2 shows an illustrative diagram for predicting whether a target system will become non-operational within a future period of time, in accordance with one or more embodiments.

FIG. 2 shows an illustrative diagram 200 for predicting whether a target system will become non-operational within a future period of time, in accordance with one or more embodiments. The system may receive data entries 202 in tabular form, where each data entry may be related to a target system and may include one or more features for the target system for a past period of time. The data entries 202 include training entries 204 and inference entries 206. The system may determine a similarity metric for each pair of the data entries 202. For example, the system may determine a Euclidean distance or a cosine similarity for each pair of the data entries 202.

The system may generate a similarity graph 208 based on the training entries 204. The similarity graph 208 may connect a node for a training entry to another node for another training entry with a similarity metric that satisfies a threshold. For example, the similarity graph 208 may connect a node for a training entry to k neighboring nodes with a similarity metric higher than those for other neighboring nodes. In another example, the similarity graph 208 may connect a node for a training entry to one or more neighboring nodes with a similarity metric that satisfies a threshold. In some embodiments, the similarity graph 208 may include a time-stamped graph as described with respect to FIG. 1. The system may provide as input the similarity graph 208 to a first machine learning model 210 (e.g., a graph neural network or another suitable machine learning model) being trained to predict whether a target system related to a node in the similarity graph 208 will be non-operational within a future period of time. For example, the graph neural network may be trained to minimize a negative log likelihood loss on the training entries 204. The system may provide training predictions 212 for nodes in the similarity graph 208 and the training entries 204 to a second machine learning model 216 (e.g., a gradient boosting machine, a logistic regression classifier, or another suitable machine learning model) being trained to predict whether a target system related to a node for a data entry will be non-operational within the future period of time.

The system may generate an updated similarity graph 218 based on the data entries 202 including the training entries 204 and the inference entries 206. The updated similarity graph 218 may connect a node for a data entry to another node for another data entry with a similarity metric that satisfies the threshold. For example, the updated similarity graph 218 may connect a node for a data entry to k neighboring nodes with a similarity metric higher than those for other neighboring nodes. In another example, the updated similarity graph 218 may connect a node for a data entry to one or more neighboring nodes with a similarity metric that satisfies a threshold. In some embodiments, the updated similarity graph 218 may include a time-stamped graph as described with respect to FIG. 1. The system may use the trained first machine learning model 220 (e.g., a trained graph neural network or another suitable trained machine learning model) to process each node for the inference entries 206 in the updated similarity graph 218 to predict whether a target system related to the node will be non-operational within the future period of time. For example, the system may generate a classification label based on an output 228 of the graph neural network. In another example, the system may generate a classification label based on one or more embeddings of a hidden layer of the graph neural network. The system may provide inference predictions 222 for nodes in the updated similarity graph 218 and the data entries 202 to the trained second machine learning model 226 (e.g., a trained gradient boosting machine, a trained logistic regression classifier, or another suitable trained machine learning model) to predict whether a target system related to a node for a data entry will be non-operational within the future period of time.

Finally, based on the trained second machine learning model 226 predicting that a target system related to a node for a data entry will be non-operational within the future period of time, the system may adjust data processing components related to the target system. For example, if the target system may be identified as a candidate for becoming non-operational within a future period of time, proactive measures may be taken to ensure that such an event does not take place by adjusting data processing components allocated to the target system (e.g., allocating more resources to prevent the target system from becoming non-operational, allocating fewer resources in anticipation of the target system becoming non-operational, etc.).

Figure 3:
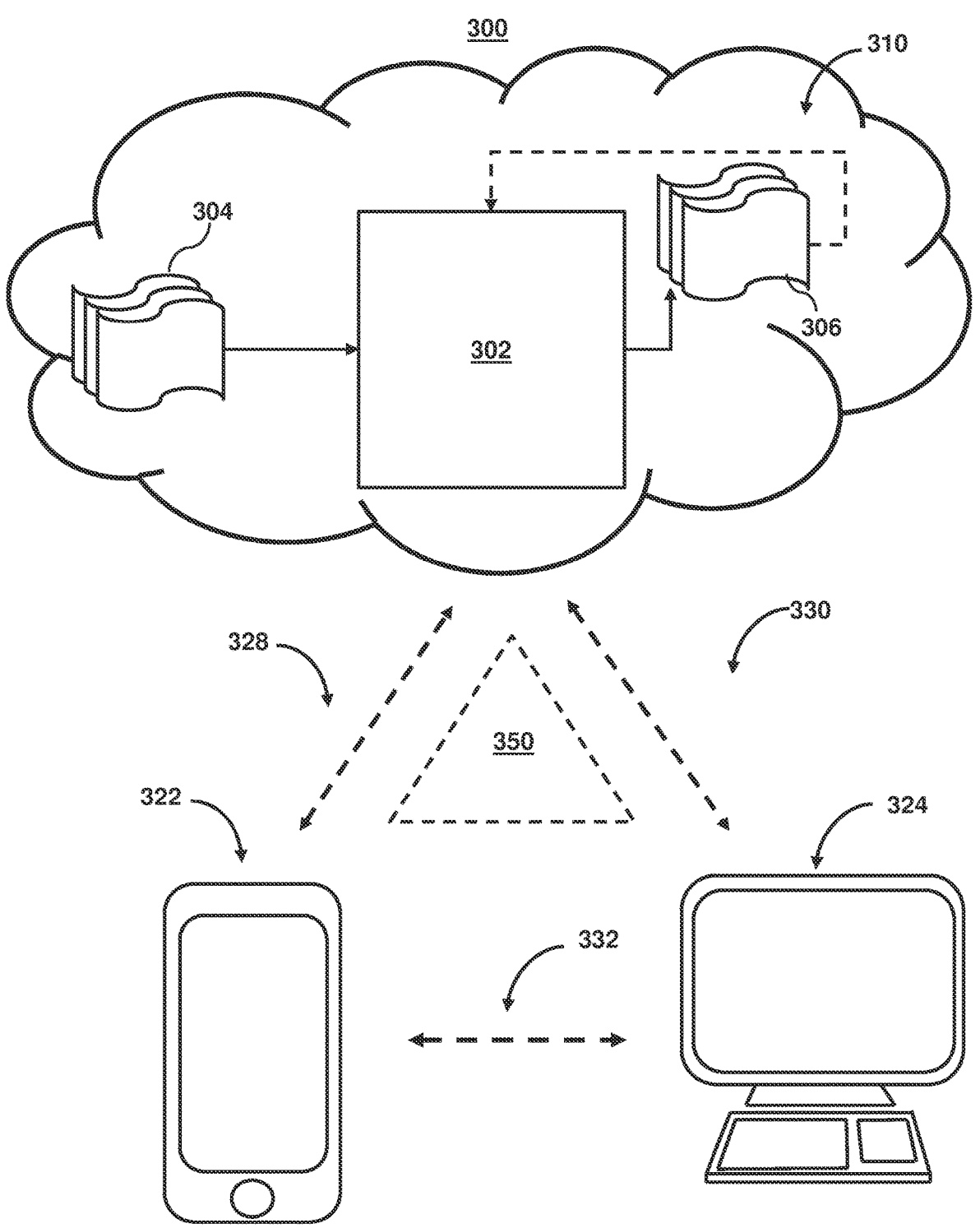
FIG. 3 shows illustrative components for a system used to adjust data processing components related to a target system predicted to be non-operational within a future period of time, in accordance with one or more embodiments.

FIG. 3 shows illustrative components for a system used to adjust data processing components related to a target system predicted to be non-operational within a future period of time, in accordance with one or more embodiments. For example, FIG. 3 may show illustrative components for adjusting data processing components allocated to an auto dealer predicted to be non-operational within a future period of time. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally. or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output ("I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen devices, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., electrically erasable programmable read-only memory (EEPROM), random access memory (RAM), etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or long term evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., Internet protocol television (IFFY)), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include components for generating one or more similarity graphs, training one or more machine learning models, and for adjusting data processing components related to a target system. Cloud components 310 may access data entries from tabular data in order to predict whether a target system will become non-operational within a future period of time. Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether a target system will be non-operational within a future period of time).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether a target system will be non-operational within a future period of time).

In some embodiments, the model (e.g., model 302) may automatically perform actions based on outputs 306. In some embodiments, the model (e.g., model 302) may not perform any actions. The output of the model (e.g., model 302) may be used to adjust data processing components related to the target system.

System 300 also includes an application programming interface (API) layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a representational state transfer (REST) or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common programming languages, including Ruby. Java, PHP, and JavaScript. Single object access protocol (SOAP) Web services have traditionally been adopted in the enterprise for publishing internal services, as well as for exchanging information with partners in business-to-business (B2B) transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front-end and back-end. In such cases, API layer 350 may use RESTful APIs (exposition to front-end or even communication between microservices). API layer 350 may use advanced message queuing protocol (AMQP) (e.g., Kafka. RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer

350 may use strong security constraints applying Web application firewall (WAF) and distributed denial-of-service (DDoS) protection, and API layer 350 may use RESTful APIs as standard for external integration.

FIG. 4 shows a flowchart of the steps involved in adjusting data processing components related to a target system predicted to be non-operational within a future period of time, in accordance with one or more embodiments. For example, the system may use process 400 (e.g., as implemented on one or more system components described above) in order to adjust data processing components allocated to an auto dealer predicted to be non-operational or go out of business within a future period of time (e.g., three months or another suitable period of time).

At step 402, process 400 (e.g., using one or more components described above) receives a plurality of data entries (e.g., data entries 202 in FIG. 2). For example, each data entry may be related to a target system and may include one or more features for the target system for a past period of time. The plurality of data entries may include first entries (e.g., training entries 204 in FIG. 2) and second entries (e.g., inference entries 206 in FIG. 2). In some embodiments, the system determines a similarity metric for each pair of the plurality of data entries (e.g., data entries 202 in FIG. 2) by determining a Euclidean distance or a cosine similarity for each pair of the plurality of data entries.

At step 404, process 400 generates a similarity graph (e.g., similarity graph 208 in FIG. 2) based on the first entries (e.g., training entries 204 in FIG. 2). In some embodiments, the system generates the similarity graph (e.g., similarity graph 208 in FIG. 2) based on the first entries (e.g., training entries 204 in FIG. 2) by connecting a node for a first entry to k neighboring nodes with a similarity metric higher than those for other neighboring nodes. In some embodiments, the system generates the similarity graph (e.g., similarity graph 208 in FIG. 2) based on the first entries (e.g., training entries 204 in FIG. 2) by connecting a node for a first entry to one or more neighboring nodes with a similarity metric that satisfies a threshold.

At step 406, process 400 provides as input the similarity graph (e.g., similarity graph 208 in FIG. 2) to a first machine learning model (e.g., first machine learning model 210 in FIG. 2) being trained to predict whether a target system related to a node in the similarity graph (e.g., similarity graph 208 in FIG. 2) will be non-operational within a future period of time (e.g., three months or another suitable period of time). In some embodiments, the first machine learning model (e.g., first machine learning model 210 in FIG. 2) comprises a graph neural network. The graph neural network may be trained to minimize a negative log likelihood loss on the first entries (e.g., training entries 204 in FIG. 2).

At step 408, process 400 generates an updated similarity graph (e.g., updated similarity graph 218 in FIG. 2) based on the plurality of data entries (e.g., data entries 202) including the first entries (e.g., training entries 204 in FIG. 2) and the second entries (e.g., inference entries 206 in FIG. 2).

At step 410, process 400 processes, using the trained first machine learning model (e.g., trained first machine learning model 220 in FIG. 2), each node for the second entries (e.g., inference entries 206 in FIG. 2) in the updated similarity graph (e.g., updated similarity graph 218 in FIG. 2) to predict whether a target system related to the node will be non-operational within the future period of time.

At step 412, process 400 provides predictions for nodes in the updated similarity graph (e.g., updated similarity graph 218 in FIG. 2) and associated data entries (e.g., data entries 202 in FIG. 2) to a second machine learning model (e.g., trained second machine learning model 226 in FIG. 2) to predict whether a target system related to a node for a data entry will be non-operational within the future period of time. In some embodiments, the second machine learning model (e.g., trained second machine learning model 226 in FIG. 2) includes a gradient boosting machine or a logistic regression classifier.

In some embodiments, the system predicts whether a target system related to a node for a data entry will be non-operational within the future period of time by generating a classification label based on an output (e.g., output 228 in FIG. 2) of the graph neural network. In some embodiments, the system predicts whether a target system related to a node for a data entry will be non-operational within the future period of time by generating a classification label based on one or more embeddings of a hidden layer of the graph neural network.

At step 414, based on the second machine learning model (e.g., trained second machine learning model 226 in FIG. 2) predicting that a target system related to a node for a data entry will be non-operational within the future period of time, process 400 adjusts data processing components related to the target system. For example, if the target system may be identified as a candidate for becoming non-operational within a future period of time, proactive measures may be taken to ensure such an event does not take place by adjusting data processing components allocated to the target system (e.g., allocating more resources to prevent the target system from becoming non-operational, allocating fewer resources in anticipation of the target system becoming non-operational, etc.).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a plurality of data entries in tabular form, each data entry related to a target system and including one or more features for the target system for a past period of time, the plurality of data entries comprising training entries and inference entries; determining a similarity metric for each pair of the plurality of data entries; generating a similarity graph based on the training entries, the similarity graph connecting a node for a training entry to another node for another training entry with a similarity metric that satisfies a threshold; providing as input the similarity graph to a graph neural network being trained to predict whether a target system related to a node in the similarity graph will be non-operational within a future period of time; generating an updated similarity graph based on the plurality of data entries including the training entries and the inference entries, the updated similarity graph connecting a node for a data entry to another node for another data entry with a similarity metric that satisfies the threshold; processing, using the trained graph neural network, each node for the inference entries in the updated similarity graph to predict whether a target system related to the node will be non-operational within the future period of time; providing predictions for nodes in the updated similarity graph and associated data entries to a gradient boosting machine or a logistic regression classifier to predict whether a target system related to a node for a data entry will be non operational within the future period of time; and in response to the gradient boosting machine or the logistic regression classifier predicting that a target system related to a node for a data entry will be non-operational within the future period of time, adjusting data processing components related to the target system.

2. A method, the method comprising: receiving a plurality of data entries, each data entry related to a target system and including one or more features for the target system for a past period of time, the plurality of data entries comprising first entries and second entries; generating a similarity graph based on the first entries; providing as input the similarity graph to a first machine learning model being trained to predict whether a target system related to a node in the similarity graph will be non-operational within a future period of time; generating an updated similarity graph based on the plurality of data entries including the first entries and the second entries; processing, using the trained first machine learning model, each node for the second entries in the updated similarity graph to predict whether a target system related to the node will be non operational within the future period of time; providing predictions for nodes in the updated similarity graph and associated data entries to a second machine learning model to predict whether a target system related to a node for a data entry will be non-operational within the future period of time; and based on the second machine learning model predicting that a target system related to a node for a data entry will be non-operational within the future period of time, adjusting data processing components related to the target system.

3. The method of any one of the preceding embodiments, wherein determining a similarity metric for each pair of the plurality of data entries comprises: determining a Euclidean distance or a cosine similarity for each pair of the plurality of data entries.

4. The method of any one of the preceding embodiments, wherein generating the similarity graph based on the first entries comprises: connecting a node for a first entry to k neighboring nodes with a similarity metric higher than those for other neighboring nodes.

5. The method of any one of the preceding embodiments, wherein generating the similarity graph based on the first entries comprises: connecting a node for a first entry to one or more neighboring nodes with a similarity metric that satisfies a threshold.

6. The method of any one of the preceding embodiments, wherein the first machine learning model comprises a graph neural network, the graph neural network being trained to minimize a negative log likelihood loss on the first entries.

7. The method of any one of the preceding embodiments, wherein predicting whether a target system related to a node for a data entry will be non-operational within the future period of time comprises: generating a classification label based on an output of the graph neural network.

8. The method of any one of the preceding embodiments, wherein predicting whether a target system related to a node for a data entry will be non-operational within the future period of time comprises: generating a classification label based on one or more embeddings of a hidden layer of the graph neural network.

9. The method of any one of the preceding embodiments, wherein the first machine learning model includes a graph neural network, and wherein the second machine learning model includes a gradient boosting machine or a logistic regression classifier.

10. A tangible, non-transitory, machine-readable medium storing instructions that, when executed by a data processing apparatus, cause the data processing apparatus to perform operations comprising those of any of embodiments 1-9.

11. A system comprising one or more processors; and memory storing instructions that, when executed by the processors, cause the processors to effectuate operations comprising those of any of embodiments 1-9.

12. A system comprising means for performing any of embodiments 1-9.

What is claimed is:

1. A system for adjusting data processing components related to a target system predicted to be non-operational within a future period of time, the system comprising:

one or more processors; and a non-transitory, computer-readable medium comprising instructions that, when executed by the one or more processors, cause operations comprising:

receiving an imbalanced dataset comprising a plurality of data entries in tabular form, each data entry related to a target system and including one or more features for the target system for a past period of time, the plurality of data entries comprising training entries and inference entries;

determining a similarity metric for each pair of the plurality of data entries;

generating a similarity graph based on the training entries, the similarity graph connecting a node for a training entry to another node for another training entry with a similarity metric that satisfies a threshold;

training a graph neural network for predicting whether a target system related to a node in the similarity graph will be non-operational within a future period of time;

generating an updated similarity graph based on the plurality of data entries including the training entries and the inference entries, the updated similarity graph connecting a node for a data entry to another node for another data entry with a similarity metric that satisfies the threshold;

processing, using the trained graph neural network, each node for the inference entries in the updated similarity graph to generate predictions indicating whether the target system related to the node will be non-operational within the future period of time;

providing the predictions for nodes in the updated similarity graph and associated data entries to a machine learning model to generate an output indicating whether the target system related to the node for a data entry will be non-operational within the future period of time, wherein the machine learning model comprises a gradient boosting machine or a logistic regression classifier; and in response to the machine learning model generating the output indicating that the target system related to the node for a data entry will be non-operational within the future period of time, adjusting computing resources related to the target system.

2. The system of claim 1, wherein determining the similarity metric for each pair of the plurality of data entries comprises:

determining a Euclidean distance or a cosine similarity for each pair of the plurality of data entries.

3. The system of claim 1, wherein generating the similarity graph based on the training entries comprises:

connecting a node for a training entry to k neighboring nodes with a similarity metric higher than those for other neighboring nodes, or connecting a node for a training entry to one or more neighboring nodes with a similarity metric that satisfies the threshold.

4. The system of claim 1, wherein training the graph neural network comprises training the graph neural network to minimize a negative log likelihood loss on the training entries.

5. A method comprising:

receiving an imbalanced dataset comprising of a plurality of data entries, each data entry related to a target system and including one or more features for the target system for a past period of time, the plurality of data entries comprising first entries and second entries;

generating a similarity graph based on the first entries;

training a first machine learning model for predicting whether a target system related to a node in the similarity graph will be non-operational within a future period of time;

generating an updated similarity graph based on the plurality of data entries including the first entries and the second entries;

processing, using the trained first machine learning model, each node for the second entries in the updated similarity graph to generate predictions indicating whether the target system related to the node will be non-operational within the future period of time;

providing the predictions for nodes in the updated similarity graph and associated data entries to a second machine learning model to generate an output indicating whether the target system related to the node for a data entry will be non-operational within the future period of time; and based on the second machine learning model generating the output indicating that the target system related to the node for a data entry will be non-operational within the future period of time, adjusting data processing components related to the target system.

6. The method of claim 5, further comprising:

determining a Euclidean distance or a cosine similarity for each pair of the plurality of data entries.

7. The method of claim 5, wherein generating the similarity graph based on the first entries comprises:

connecting a node for a first entry to k neighboring nodes with a similarity metric higher than those for other neighboring nodes.

8. The method of claim 5, wherein generating the similarity graph based on the first entries comprises:

connecting a node for a first entry to one or more neighboring nodes with a similarity metric that satisfies a threshold.

9. The method of claim 5, wherein the first machine learning model comprises a graph neural network, further comprising:

training the graph neural network to minimize a negative log likelihood loss on the first entries.

10. The method of claim 9, wherein generating predictions indicating whether the target system related to the node for a data entry will be non-operational within the future period of time comprises:

generating a classification label based on an output of the graph neural network.

11. The method of claim 9, wherein generating predictions indicating whether the target system related to the node for a data entry will be non-operational within the future period of time comprises:

generating a classification label based on one or more embeddings of a hidden layer of the graph neural network.

12. The method of claim 5, wherein the first machine learning model includes a graph neural network, and wherein the second machine learning model includes a gradient boosting machine or a logistic regression classifier.

13. A non-transitory, computer-readable medium comprising instructions that, when executed by one or more processors, cause operations comprising:

receiving an imbalanced dataset comprising of a plurality of data entries, each data entry related to a target system and including one or more features for the target system for a past period of time, the plurality of data entries comprising first entries and second entries;

generating a similarity graph based on the first entries;

training a first machine learning model for predicting whether a target system related to a node in the similarity graph will be non-operational within a future period of time;

generating an updated similarity graph based on the plurality of data entries including the first entries and the second entries;

processing, using the trained first machine learning model, each node for the second entries in the updated similarity graph to generate predictions indicating whether the target system related to the node will be non-operational within the future period of time;

providing the predictions for nodes in the updated similarity graph and associated data entries to a second machine learning model to generate an output indicating whether the target system related to the node for a data entry will be non-operational within the future period of time; and based on the second machine learning model generating the output indicating that the target system related to the node for a data entry will be non-operational within the future period of time, adjusting data processing components related to the target system.

14. The non-transitory, computer-readable medium of claim 13, further comprising:

determining a Euclidean distance or a cosine similarity for each pair of the plurality of data entries.

15. The non-transitory, computer-readable medium of claim 13, wherein generating the similarity graph based on the first entries comprises:

connecting a node for a first entry to k neighboring nodes with a similarity metric higher than those for other neighboring nodes.

16. The non-transitory, computer-readable medium of claim 13, wherein generating the similarity graph based on the first entries comprises:

connecting a node for a first entry to one or more neighboring nodes with a similarity metric that satisfies a threshold.

17. The non-transitory, computer-readable medium of claim 13, wherein the first machine learning model comprises a graph neural network, further comprising:

training the graph neural network to minimize a negative log likelihood loss on the first entries.

18. The non-transitory, computer-readable medium of claim 17, wherein generating predictions indicating whether the target system related to the node for a data entry will be non-operational within the future period of time comprises:

generating a classification label based on an output of the graph neural network.

19. The non-transitory, computer-readable medium of claim 17, wherein generate predictions indicating whether the target system related to the node for a data entry will be non-operational within the future period of time comprises:

generating a classification label based on one or more embeddings of a hidden layer of the graph neural network.

20. The non-transitory, computer-readable medium of claim 13, wherein the first machine learning model includes a graph neural network, and wherein the second machine learning model includes a gradient boosting machine or a logistic regression classifier.

\* \* \* \* \*